United States Patent [19]

Kennedy

[11] 4,073,110

[45] Feb. 14, 1978

[54] FLOOR DECK STRUCTURE

[76] Inventor: Samuel F. Kennedy, 415 E. Park, Taylorville, Ill. 62568

[21] Appl. No.: 724,588

[22] Filed: Sept. 20, 1976

[51] Int. Cl.² ........................... E04C 1/30; F24F 7/00
[52] U.S. Cl. ...................................... 52/303; 52/579; 52/588; 98/31; 98/55
[58] Field of Search ................. 52/177, 473, 579, 529, 52/588, 530, 302, 531, 303, 532; 98/31, 55

[56] References Cited

U.S. PATENT DOCUMENTS

| 1,462,343 | 7/1923 | Jenkins | 52/473 X |
| 1,508,871 | 9/1924 | Bloetan | 52/531 |
| 2,648,409 | 8/1953 | Daugherty et al. | 52/588 X |
| 3,049,198 | 8/1962 | Dobbins et al. | 52/579 X |
| 3,426,445 | 2/1969 | Steffen | 52/303 X |
| 3,531,874 | 10/1970 | Sukup | 98/55 X |
| 3,591,994 | 7/1971 | Steffen | 52/303 X |
| 3,640,035 | 2/1972 | Butterfield | 52/177 |
| 3,691,687 | 9/1972 | Economou | 52/473 X |
| 3,841,776 | 10/1974 | Klaus | 52/588 X |

FOREIGN PATENT DOCUMENTS

| 655,798 | 4/1929 | France | 98/55 |
| 575,624 | 4/1933 | Germany | 52/473 |
| 6,362 of | 1884 | United Kingdom | 52/529 |

Primary Examiner—Leslie Braun
Attorney, Agent, or Firm—Wegner, Stellman, McCord, Wiles & Wood

[57] ABSTRACT

In a fabricated rigid floor deck structure assembled from a plurality of similar floor sections, a floor section is formed for engagement with an adjacent similar section to form an interlocked floor structure. Each floor section is constructed from an elongate plate having a male and a female flange each having a U-shaped cross section. The female flange has one leg depending from one edge of the plate with its other leg positioned outwardly of the one edge to define an upwardly opening channel laterally outward from the plate. The male flange has one leg depending from the opposite edge of the plate with its other leg positioned inwardly of the other edge adjacent the bottom surface of the plate. The flanges are dimensioned so that adjacent floor sections are locked together in suitable alignment by placing the male flange into the channel defined by the female flange of an adjacent aligned floor section. A plurality of elongate embossments are raised from the top surface of the plate and extend laterally across the plate to provide structural strength. Openings are formed through the sides of the embossments in a plane generally perpendicular to the plane of the plate to permit air flow from one side of the plate to the other.

4 Claims, 5 Drawing Figures

U.S. Patent  Feb. 14, 1978  4,073,110
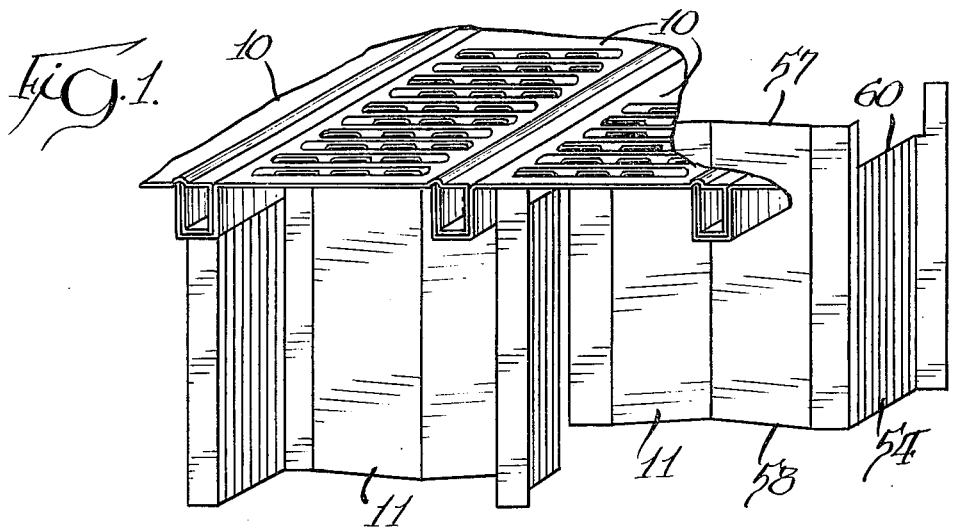
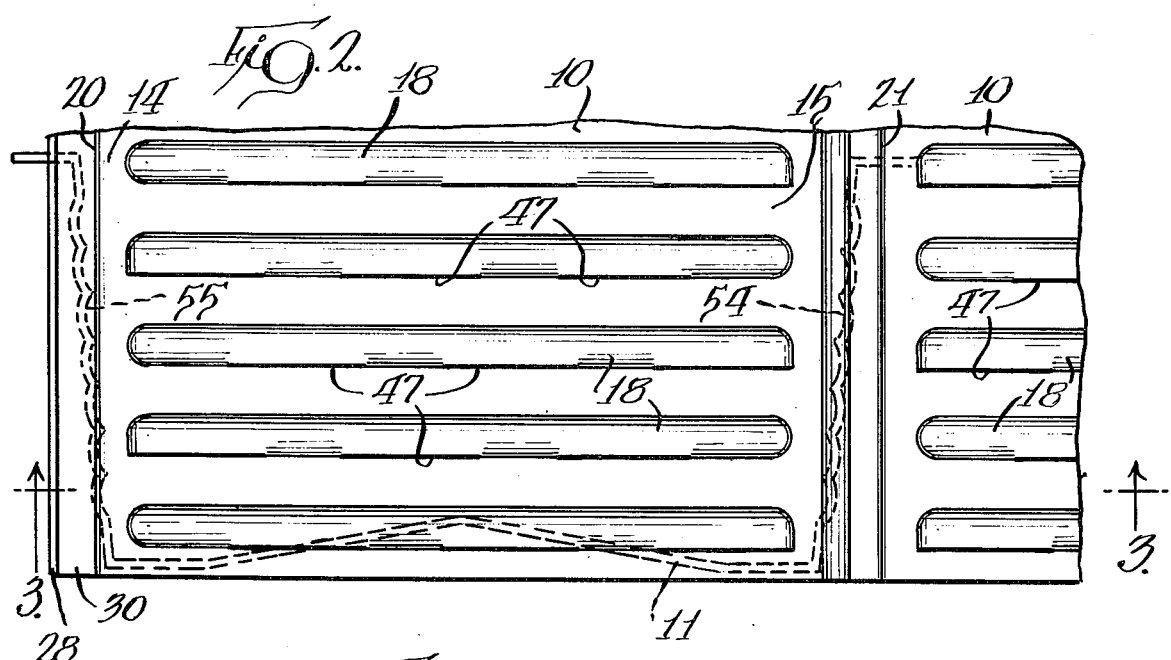
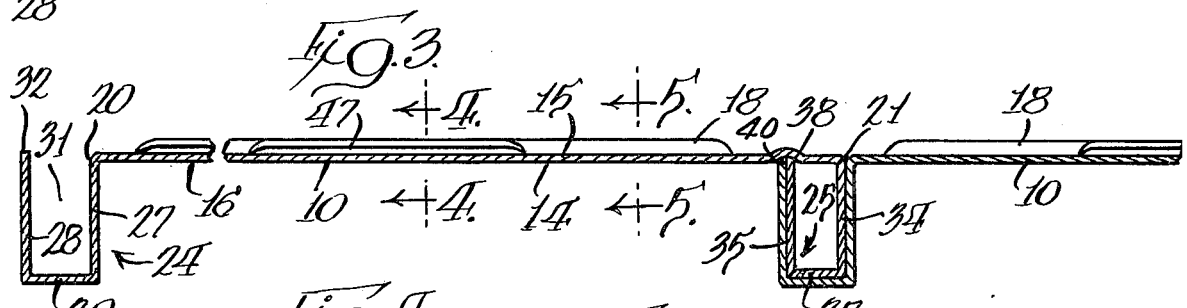
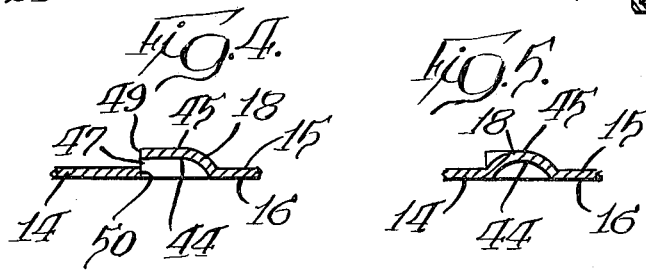

FLOOR DECK STRUCTURE

BACKGROUND OF THE INVENTION

This invention relates generally to floor deck structures and, more particularly, to a floor assembled from a plurality of similar interlocking floor sections having ventilation openings formed therein.

While it is intended that the floor deck structure described herein by employed in grain bins and the like, the floor deck structure is not limited to utilization in such an environment. A floor of the general type shown herein is assembled from a series of elongate sections which are locked edge to edge to form a complete floor. Each section is usually formed entirely from a single sheet or plate of metal.

The floor structures in the prior art have a variety of means for joining interconnecting floor sections together in edge-to-edge relationship. In one construction, the adjacent floor sections each have male and female J-shaped flanges, one of the flanges depending from each longitudinal edge of a flat floor plate. The male flange being slightly smaller fits within the female flange of an adjacent section to lock the sections together, the joint thereby having a J-shaped cross section. In another design, a floor section has a rectilinear male flange of unitary thickness depending from one longitudinal edge and a relatively narrow U-shaped or folded female flange depending from the other longitudinal edge which defines a narrow channel. The channel receives the male flange of an adjacent floor section so that there is a triple layer of vertically oriented material at each joint. Yet another construction employs floor sections with oppositely oriented Z-shaped flanges, the female flange having an upright free end. The male flange is received by the female flange to form a joint between adjacent sections having a triangular cross section. Unless provided with an undue number of supports, the aforementioned floor structures generally lack sufficient strength to support extremely large loads without deforming and causing separation of the joints between the floor sections.

In order to provide additional structural stiffness and strength to an otherwise bendable flat plate without increasing the amount or weight of the plate, corrugations or embossments are usually formed in the plate. These corrugations or embossments tend to resist nonparallel bending moments so as to prevent the plate from collapsing along a line transverse to the corrugations or embossments. Various types are known. The plate may be sinuously formed so that the plate has a wavy cross section. Alternatively, embossments can be raised from the plate and arranged in parallel rows or columns. The embossments may even be "randomly" distributed in many different directions to resist bending to some extent in substantially all directions.

In one prior art floor, a series of spaced embossments are arranged in a laterally extending row. A plurality of such rows are formed in parallel fashion in the plate with every other row being offset, the embossments thereby laterally spanning the plate to prevent bending along a longitudinal line. However, the plate is still subject to bending under load along a diagonal line between the rows through the spaces between the embossments in each row.

In applications where ventilation is required, such as grain bins where air flow prevents spoilage of stored grain, ventilation is provided through the floor structure by perforating the plate. However, if the perforations are not properly located, the strength of the plate will be lessened. Obviously, it is desirable to form perforations of sufficient number and size, but not to an extent which would substantially reduce the strength of the plate. The perforations may be formed by punching apertures in the plate. In one prior art construction, embossments are raised from the plate in a manner which will cause the surface to separate under tension, thereby generating openings through the plate at the top of each embossment. However, these methods render the floor "rough" so that the floor is not easily swept clean. In addition, if an auger is used to remove grain from a bin having such floors, the auger blade often catches in the perforations thereby damaging the auger or the floor or both. Further, if the perforations in the plate open upwardly, grain has a tendency to come to rest vertically over these openings to prevent proper air flow.

SUMMARY OF THE INVENTION

It is the principal object of the invention to provide a fabricated floor section in which adjacent floor sections may be locked together so that under full loading the joints between floor sections do not separate and to provide a floor section with a contour rib structure providing greater strength and having ventilation openings which do not reduce structural strength and which are not subject to clogging.

In accordance with the invention, a floor section is formed generally from a flat plate and has a pair of U-shaped flanges depending downwardly from opposite longitudinal edges of the plate, one flange extending outwardly from the plate, the other flange extending inwardly under the plate. A series of parallel transverse embossments or ribs raised from the plate extend continuously across the plate, the embossments having openings formed in the sides thereof to permit ventilation between the sides of the plate.

When a floor section formed in accord with the invention is put under a load, the interlocking flanges hold the joint together to prevent grain from falling into the joint. Under load the top surface may sag slightly but the joint remains under tension and the flange walls interact with one another to maintain a close joint and resist the moment forcing the joint apart. As a result, there is less rocking and better bearing on the floor supports.

The interlocking U-shaped flanges provide substantial strength, since a square box-like joint is formed having four distinct vertically supporting legs. The legs act as a built-in rafter to resist lateral bending and absorb the load on the surface of the plate. The free ends of the flanges fit into a longitudinal groove formed in the bottom surface of the plate when the flanges are engaged so that the ends are held against lateral movement under load.

The interlocking flanges may have a height and a width which is less than that of J-shaped flanges and yet have greater strength. Consequently, when the flanges are formed prior to roll forming the embossments, the embossments can be impressed nearer the edges of the plate. In addition, when the sections are in inserted nested relation for shipping, less space is occupied thereby reducing shipping costs.

The continuous lateral embossments resist longitudinal bending and render the floor section stronger than the prior art sections having laterally spaced embossments. The joint provides support against bending along a lateral line while the embossments preventing bending along a longitudinal line so that a floor deck assembled from a number of separate sections has sufficient strength to support a large load.

The utilization of continuous embossments and vertical ventilating opening renders the floor easier to sweep and allows use of an auger so that it does not catch in the openings. The openings do not reduce the strength of the embossments or the plate.

BRIEF DESCRIPTION OF THE DRAWINGS

FIG. 1 is a fragmentary perspective view of a floor deck structure having interlocked floor sections and supporting legs;

FIG. 2 is an enlarged fragmentary top plan view of the floor structure of FIG. 1 illustrating the arrangement of the parallel laterally extending raised embossments;

FIG. 3 is an enlarged cross-sectional view taken along line 3—3 of FIG. 2 illustrating the locking structure and the orientation of the openings in the embossments;

FIG. 4 is a cross-sectional view taken along line 4—4 of FIG. 3 illustrating the construction of an embossment at a point at which an opening is formed; and FIG. 5 is a cross-sectional view taken along line 5—5 of FIG. 3 illustrating the construction of an embossment at a point at which no opening is formed.

DESCRIPTION OF THE PREFERRED EMBODIMENT

Referring to FIG. 1, a portion of a fabricated rigid floor deck structure is seen to include a plurality of adjacently disposed floor sections 10 and a plurality of support legs 11. Each of the floor sections 10 is formed from a plate 14, preferably, 20 gauge galvanized steel. The plate 14 has a generally planar top surface 15 and a generally planar bottom surface 16.

Raised from the top surface 15 of the plate 14 are a plurality of parallel ribs or embossments 18 extending laterally across the plate 14 between opposite longitudinal edges 20 and 21. The embossments 18 have a length which is slightly less than the width of the top surface 15 of the plate 14. The embossments 18 provide structural strength for the otherwise flat plate 14 and tend to resist any downward force which would cause the plate 14 to bend along a longitudinal line.

Depending from the edge 20 is a U-shaped, female, receiving flange, generally designated 24, and depending from the edge 21 is a U-shaped, male, inserting flange, generally designated 25. The flanges 24 and 25 extend the length of the plate 14 and may be formed by appropriate bending of the edge portions of the plate. As shown in FIGS. 1 and 2, the flanges 24 and 25 are joined together to interlock the adjacent floor sections 10 and act as built-in rafters to resist a downward force which tends to bend the plate 14 along a lateral line.

Referring specifically to FIG. 3, the female flange 24 is seen to include an inner leg portion 27, and outer leg portion 28 and an interconnecting bight portion 30, all of which define an upwardly opening channel 31. The top of the inner leg portion 27 depends from the edge 20 of the plate 14 and is generally perpendicular to the top surface 15 and the bottom surface 16 of the plate 14. Likewise, the outer leg portion 28 is perpendicular to the plate 14 and has a free upper end 32 spaced from the edge 20 but lying generally in the plane of the plate 14. The bight portion 30 extends between the lower ends of the leg portions 34 and 35 and is parallel to the plane of the plate 14.

Similarly, the male flange 25 includes an outer leg portion 34, and inner leg portion 35 and an interconnecting bight portion 37. The outer leg portion 34 depends from the edge 21 of the plate 14 and is generally pependicular to the top surface 15 and bottom surface 16 of the plate 14. The inner leg portion 35 is also perpendicular to the plate 14 and has a free upper end 38 which is disposed within a groove 40 in the bottom surface 16 of the plate 14 which has been formed in the plate 14. The bight portion 37 extends between the lower ends of the leg portions 34 and 35 and is generally parallel to the plane of the plate 14.

As evident by examination of FIG. 3, the lateral width of the male flange 25 is less than the inner width of the female flange 24 so that the male flange 25 is engageable within the channel 31 defined by the female flange 24 between the leg 27 and 28. It should be apparent that the leg portions 34 and 35 are shorter than the legs 27 and 28 by the thickness of the sheet metal so that when the flanges 24 and 25 are engaged, the upper surfaces 15 of the plates 14 are properly aligned. When adjacent flanges 24 and 25 are engaged to define a joint having a box-like cross section, the free ends 32 and 38 are both positioned within the groove 40 so that they are held against lateral movement.

Referring to FIGS. 4 and 5, it is seen that the embossments 18 are formed in the plate 14 by forcing the bottom surface 16 upwardly to form an arcuate undersurface 44 and an arcuate top surface 45. The undersurface 44 has a height which extends beyond the plane of the top surface 15. As seen in FIGS. 3 and 4, the embossments 18 are provided with a plurality of openings 47. The openings 47 are formed by separating one side of the embossment 18 from the plate 14 and raising it to the height of the center of the embossment 18 so as to expose an edge 49 of the embossment 18 and an edge 50 of the plate 14. Thus, the openings 47 are formed through the side of the embossment 18 and lie in a plane generally perpendicular to the top surface 15 of the plate 14 to permit air flow from one side of the plate 14 to the other.

As indicated in phantom in FIG. 2, the legs 11 are generally U-shaped with outwardly diverging sides 54 and 55. The legs 11 are provided with a plurality of structural bends extending from an upper edge 57 to a bottom edge 58 to provide structural strength preventing the legs 11 from bending along a line generally parallel to the ground. As best seen in FIG. 1, a recess 60 is cut in the upper edge 57 of the sides 54 so that the engaged flanges 24 and 25 may be received therein. A similar recess (not shown) is cut in the other side 55. As a result, almost every point on the upper edge 57 of each leg 11 is in contact and supports the floor above it. The legs 11 support not only the built-in rafters (the engaged flanges 24 and 25) but also the bottom surface 16 of the plate 14 which extends between the flanges 24 and 25. The U-shaped configuration of the legs 11 permits the legs 11 to be placed upright on the ground without support to hold the floor structure at a short distance off the ground. To provide better support, the legs 11 are placed with alternating orientations as seen in FIG. 1.

I claim:

1. In a fabricated rigid floor deck structure assembled from a plurality of similar floor sections, each section being formed for engagement with an adjacent similar section to form an interlocking floor structure, a floor section comprising:

an elongate plate having generally planar top and bottom surfaces and a plurality of substantially parallel elongate embossments raised from the top surface, said embossments extending laterally continuously between points adjacent the opposite longitudinal edges of said plate and having openings formed through the sides of said embossment in a plane generally perpendicular to the plane of said plate to permit air flow from one side of the plate to the other.

a male flange having a generally U-shaped cross section and having inner and outer leg portions generally perpendicular to the plane of said plate, said male flange having its outer leg downwardly depending from one of said longitudinal edges of said plate, the inner leg of said male flange extending upwardly and having a free end positioned inwardly of said one edge lying above the plane of the bottom surface of said plate, one portion of the bottom surface having a longitudinal groove formed thereon aligned generally with said free end of said male flange with said free end extending into said groove; and a female flange having a generally U-shaped cross section and having inner and outer leg portions generally perpendicular to the plane of said plate, said female flange having its inner leg downwardly depending from the other of said longitudinal edges of said plate, the outer leg of said female flange extending upwardly and having a free end positioned outwardly of said other edge lying above the plane of the bottom surface of said plate, said female flange defining an upwardly opening channel laterally outward from said plate, said flanges being dimensioned so that adjacent floor sections are locked together in suitable alignment by placing said male flange into the channel defined by the female flange of an adjacent aligned floor section, the free end of the female flange of the adjacent floor section also extending into said groove when said male flange and said female flange of the adjacent floor sections are engaged, whereby the free ends of the respective flanges when engaged are adjacently disposed stabilized against lateral movement within said groove.

2. In a fabricated rigid floor deck structure assembled from a plurality of similar floor sections, each section being formed for engagement with an adjacent similar section to form an interlocked floor structure, a floor section comprising:

an elongate plate having generally planar top and bottom surfaces and longitudinally extending opposite edges;

an inserting flange having a generally U-shaped cross section and having inner and outer leg portions generally perpendicular to the plane of said plate having its outer leg downwardly depending from one of said longitudinal edges of said plate, the inner leg of said inserting flange extending upwardly and having a free end positioned inwardly of said one edge lying above the plane of the bottom surface of said plate, the bottom surface having one portion configured to receive the free end; and a receiving flange having a generally U-shaped cross section and having inner and outer leg portions generally perpendicular to the plane of said plate, said receiving flange having its inner leg downwardly depending from the other of said longitudinal edges of said plate, the outer leg of said receiving flange extending upwardly and having a free end positioned outwardly of said other edge lying above the plane of the bottom surface of said plate, said receiving flange defining an upwardly opening channel laterally outward from said plate, said flanges being dimensioned so that adjacent floor sections are locked together in suitable alignment by placing said inserting flange into the channel defined by the receiving flange of an adjacent aligned floor section, whereby a joint having a box-like cross section is defined between adjacent floor sections and the free ends of the respective flanges when engaged are adjacently disposed and stabilized against lateral movement at said one portion be said plate.

3. A floor section of claim 2 wherein said one portion of the bottom surface is a longitudinal groove formed in the bottom surface aligned generally with said free end of said inserting flange, said free end of the receiving flange of an adjacent aligned floor section also extending into said groove when said inserting flange and the receiving flange of the adjacent floor section are engaged.

4. In a fabricated rigid floor deck structure assembled from a plurality of similar floor sections, each section being formed for engagement with an adjacent similar section to form an interlocked floor structure, a floor section comprising:

an elongate plate having generally planar top and bottom surfaces and longitudinally extending opposite edges;

a male flange having an outer leg downwardly depending from one of said longitudinal edges of said plate and an inner leg extending upwardly with a free end positioned inwardly of said one lying above the plane of the bottome surface of said plate, said plate having a longitudinal groove formed in its bottom surface aligned generally with said free end of said male flange, said free end of said male flange extending into said groove; and a female flange having an inner leg downwardly depending from the other of said longitudinal edges of said plate and an outer leg extending upwardly with a free end positioned outwardly of said other edge lying above the plane of the bottom surface of said plate, said female flange defining an upwardly opening channel laterally outward from said plate, said flanges being dimensioned so that adjacent floor sections are locked together in suitable alignment by placing said male flange into the channel defined by the female flange of an adjacent aligned floor section, the free end of the female flange of the adjacent floor section also extending into said groove so that both free ends are held against lateral movement by the plate.

* * * * *